(12) United States Patent
Ramos et al.

(10) Patent No.: US 6,396,241 B1
(45) Date of Patent: May 28, 2002

(54) INDUCTIVE CHARGING SYSTEM EMPLOYING A FLUID-COOLED TRANSFORMER COIL AND TRANSMISSION CABLE

(75) Inventors: Sergio Ramos, Harbor City, CA (US); George R. Woody, Wiesbaden (DE); Ray G. Radys, Santa Monica; John T. Hall, Woodland Hills, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/663,623

(22) Filed: Sep. 18, 2000

(51) Int. Cl.[7] .............................. H01J 7/00; H02G 7/00; H02K 7/20
(52) U.S. Cl. ...................... 320/108; 174/47; 361/699
(58) Field of Search ........................... 320/108; 336/58, 336/60; 174/15.1, 47; 361/699

(56) References Cited

U.S. PATENT DOCUMENTS

| | | | | |
|---|---|---|---|---|
| 5,341,083 A | * | 8/1994 | Klontz et al. ............ 320/108 |
| 5,408,209 A | * | 4/1995 | Tanzer et al. ............ 336/60 |
| 5,412,304 A | * | 5/1995 | Abbott .................... 320/108 |
| 5,545,966 A | * | 8/1996 | Ramos et al. ............ 320/108 |
| 5,591,937 A | * | 1/1997 | Woody et al. ............ 174/5 R |
| 5,594,315 A | * | 1/1997 | Ramos et al. ............ 320/108 |
| 5,684,380 A | * | 11/1997 | Woody et al. ............ 320/108 |
| 6,175,212 B1 | * | 1/2001 | Oguri ...................... 320/108 |

* cited by examiner

Primary Examiner—Gregory Toatley
(74) Attorney, Agent, or Firm—Christopher DeVries

(57) ABSTRACT

An inductive charging apparatus for use in charging batteries of an electric vehicle. The apparatus has a power source, cooling fluid pumping and cooling apparatus, and a charge port disposed in the electric vehicle. An inductive charging coupler that is insertable into the charge port comprises a housing, a ferrite puck, and an insulated, liquid-cooled, current-carrying conductive tubular transformer coil disposed around the puck. A liquid-cooled, liquid-carrying tubular transmission cable is coupled to the power source, to the cooling fluid pumping and cooling apparatus, and to the transformer coil. The transmission cable couples current from the power source to the transformer coil, and couples cooling fluid between the cooling fluid pumping and cooling apparatus and the transformer coil. The transformer coil may be a multilevel helix, spiral fluid-cooled transformer coil such as an eight turn (although n turns are possible), two level helix, four turn spiral winding. The transformer coil comprises an insulated tube high current carrying capacity conductor that optimizes AC and high frequency losses while providing a heat exchanger for the apparatus.

16 Claims, 5 Drawing Sheets

INDUCTIVE CHARGING SYSTEM EMPLOYING A FLUID-COOLED TRANSFORMER COIL AND TRANSMISSION CABLE

BACKGROUND OF THE INVENTION

The present invention relates generally to inductive charging systems and, more particularly, to an inductive charging system and improved fluid-cooled transformer coil and transmission cable for use therein.

The assignee of the present invention designs and develops electric vehicles and electric vehicle charging systems. For reference purposes, U.S. Pat. No. 5,684,380 entitled "Oil Cooled High Power Inductive Coupler" assigned to the assignee of the present invention discloses an inductive coupler for use in electric vehicle charging systems.

In an electric vehicle charging system, heat dissipation increases in relation to the square of the current being transferred to the electric vehicle. As power increases, the amount of heat produced in the power electronics package, cable and coupler becomes significant. The coupler alone dissipates in excess of 180 watts over a 20 square inch area (surface area approximately equivalent to the palm size of an adult human hand). In an unmanaged situation, such heat flux leads to unacceptable touch temperature profiles for the cable and coupler. An appropriate thermal management system is essential to add practicality, reliability and efficiency throughout the entire inductive charging system.

There is sufficient accumulated analysis and experience with inductive charging systems previously developed by the assignee of the present invention to determine the disadvantages encountered if its rate of charge is increased. The most obvious disadvantages are an increase on physical size and a limited rate of charge of the electric vehicle. These restrictions are dictated by the amount of heat produced and the fact that the system relies on heat conduction, via liquid to air heat and/or air to air heat exchangers.

This approach limits the system, and the system must provide cooling to slightly above ambient and charge rates are below level 1, which is below 1.44 kW. If charge rates larger than this value are required, the physical size of heat exchangers and fans will be prohibitive as power dissipation increases throughout the system, including the electronic package, cable and coupler. Furthermore, the noise created by a fan or blowers will be substantially increased as more air is forced through the system.

Therefore, it would be desirable to have a liquid-cooled inductive charging system that enhances the cooling efficiency of the entire system and maintains touch temperatures of user interface components (cable and coupler) well within acceptable limits. It would be desirable to have an improved multilevel helix, spiral fluid-cooled transformer coil that improves the heat dissipating capability of inductive charging systems, such as electric vehicle charging systems, and the like. It would also be desirable to have an improved fluid-cooled transmission cable that improves the heat dissipating capability of inductive charging systems, such as electric vehicle charging systems, and the like.

SUMMARY OF THE INVENTION

The present invention provides for an improved inductive charging system, fluid-cooled transformer coil, and fluid-cooled transmission cable for use in charging electric vehicle battery packs. An exemplary embodiment of the inductive charging system comprises a power source, cooling fluid pumping and cooling apparatus and a charge port, such as may be disposed in an electric vehicle that is coupled to batteries thereof. The charge port comprises a secondary winding of the charging system. A high power fluid-cooled inductive charging coupler that is insertable into the charge port to couple power from the power source to charge the batteries of the electric vehicle is provided. The inductive charging coupler comprises a housing, a ferrite puck, and an insulated, liquid-cooled, current-carrying conductive tubular transformer coil disposed around the ferrite puck that forms a primary winding of the charging system. A liquid-cooled, liquid-carrying tubular transmission cable is coupled to the power source, to the cooling fluid pumping and cooling apparatus, and to the tubular transformer coil, that couples current thereto from the power source, and couples cooling fluid thereto.

An exemplary embodiment of the transformer coil is a multilevel helix, spiral fluid-cooled transformer coil that comprises an eight turn (although n turns are possible), two level helix, four turn spiral winding, comprising an insulated tube high current carrying capacity conductor that optimizes AC and high frequency losses. Level 2 (6.66 kW) charging systems may readily utilize this primary winding without requiring liquid cooling. The same primary winding may be used with liquid cooling for Level 3 charging greater than 7.68 kW. The present invention reduces the size, volume and operating temperature of the charging system while increasing the power density and reliability of the system.

The inductive charging system operates in a fast and efficient manner while maintaining the touch temperature of user interface components of the system well within acceptable limits. The transformer coil may be advantageously used in an off-board inductive charger system and may also be incorporated in an onboard charging system (charge port) using a compact closed loop system installed/modified existing cooling system on an electric vehicle.

The multilevel helix, spiral fluid-cooled transformer coil may be readily employed when a super fast rate of charging the battery pack that powers electrically-powered vehicles is desired. Also, the present invention provides for a more compact design without causing thermal runaway or compromising power density.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENT

Figure 1:
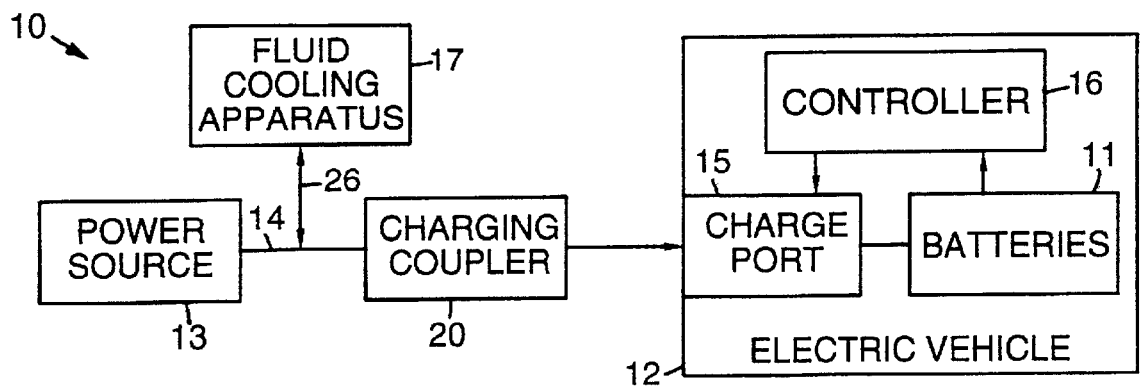
FIG. 1 is a block diagram that illustrates an exemplary inductive charging system employing an inductive coupler in accordance with the principles of the present invention.

Referring to the drawing figures, FIG. 1 is a block diagram that illustrates an exemplary inductive charging system 10 employing an inductive charging coupler 20 in accordance with the principles of the present invention. The inductive charging system 10 comprises a power source 13 that is connected by a cable 14 to the inductive charging coupler 20. Cooling fluid pumping and cooling apparatus 17 is coupled by way of the cable 14 to the inductive charging coupler 20 and is used to cool and pump cooling fluid 26 through the cable 14 and coupler 20. The cooling fluid 26 may comprise a conventional antifreeze-type coolant, for example.

The inductive charging coupler 20 is designed to be inserted into a charge port 15 located in an electric vehicle 12. The inductive charging coupler 20 forms a primary of a transformer while the charge port 15 forms a secondary thereof. Once the inductive charging coupler 20 is inserted into the charge port 15, power is transferred from the power source 13 to propulsion batteries 11 of the electric vehicle 12.

Figure 2:
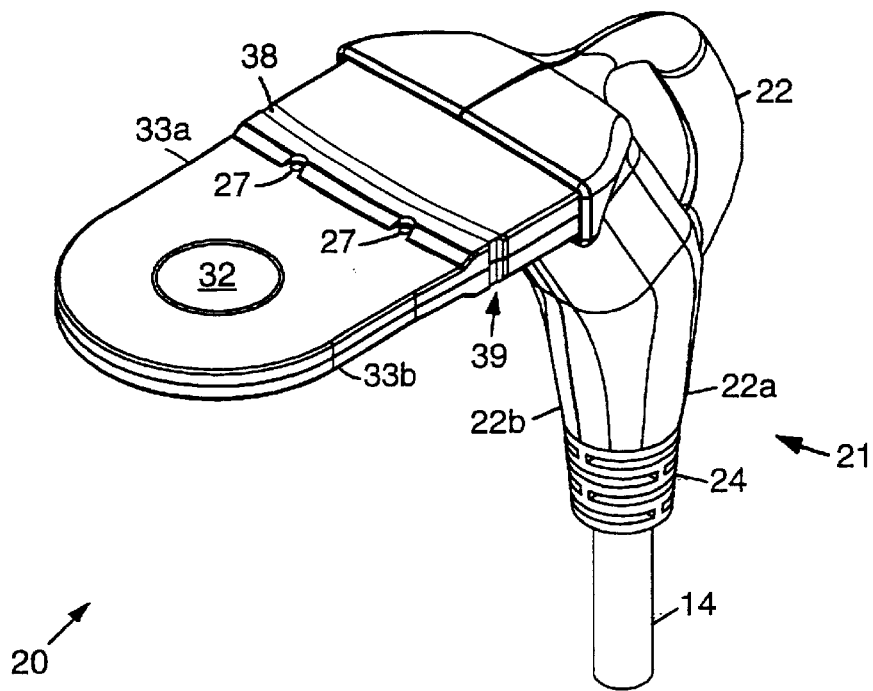
FIG. 2 is a perspective view of an exemplary inductive coupler in accordance with the present invention.
Figure 3:
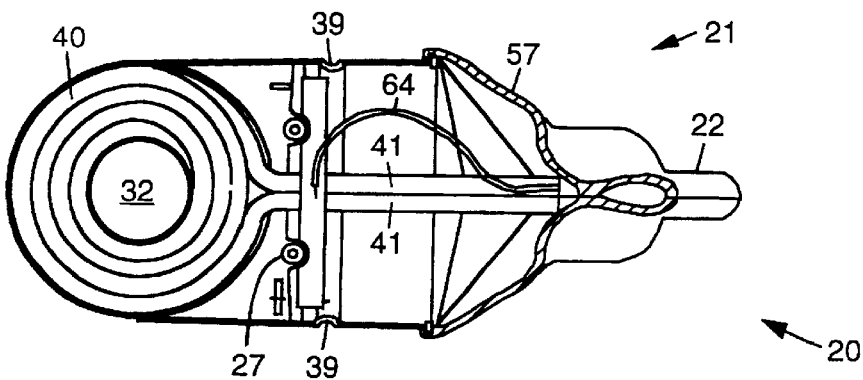
FIG. 3 illustrates a cutaway top view of the inductive coupler shown in FIG. 2.
Figure 4:
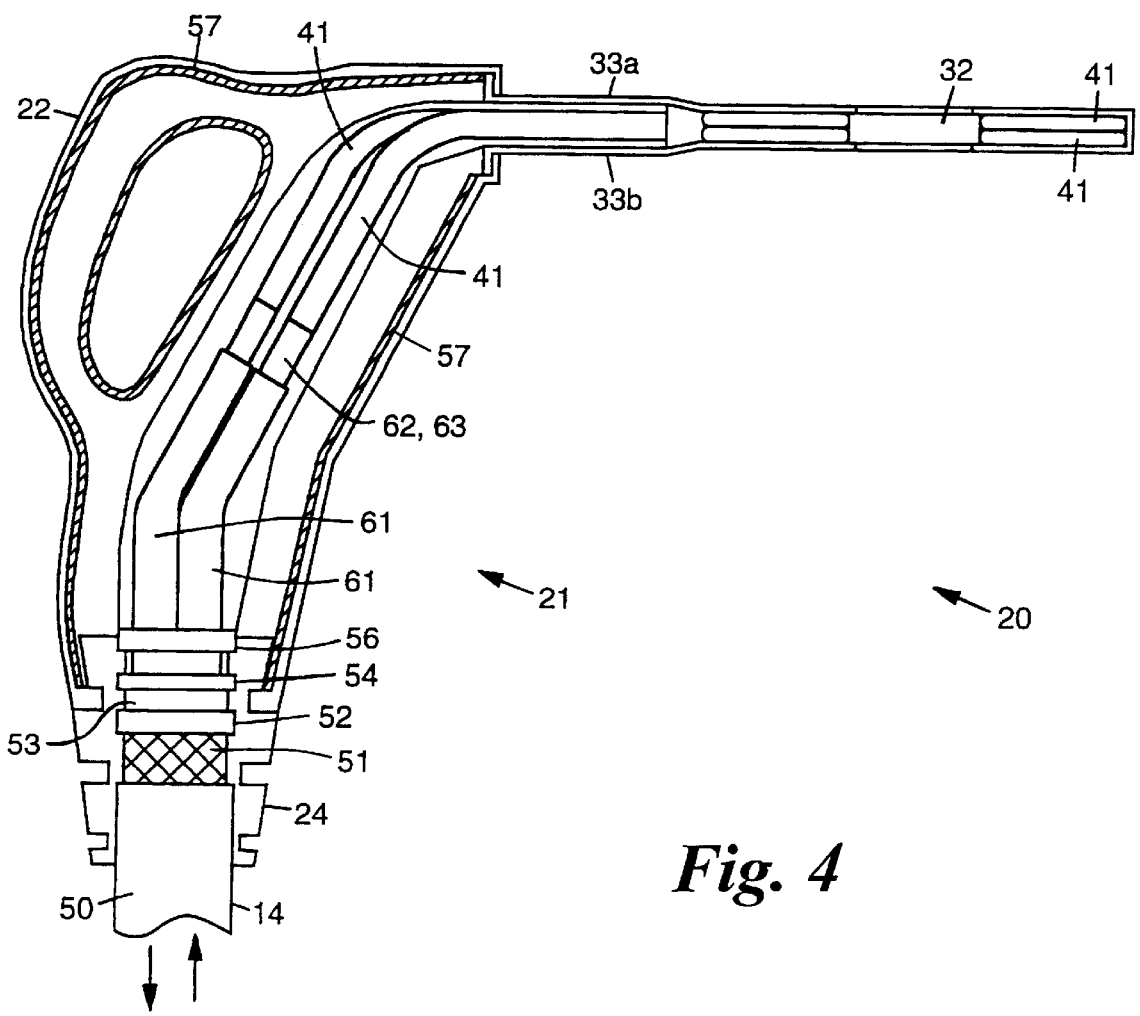
FIG. 4 illustrates a first cutaway side view of the inductive coupler shown in FIG. 2.
Figure 5:
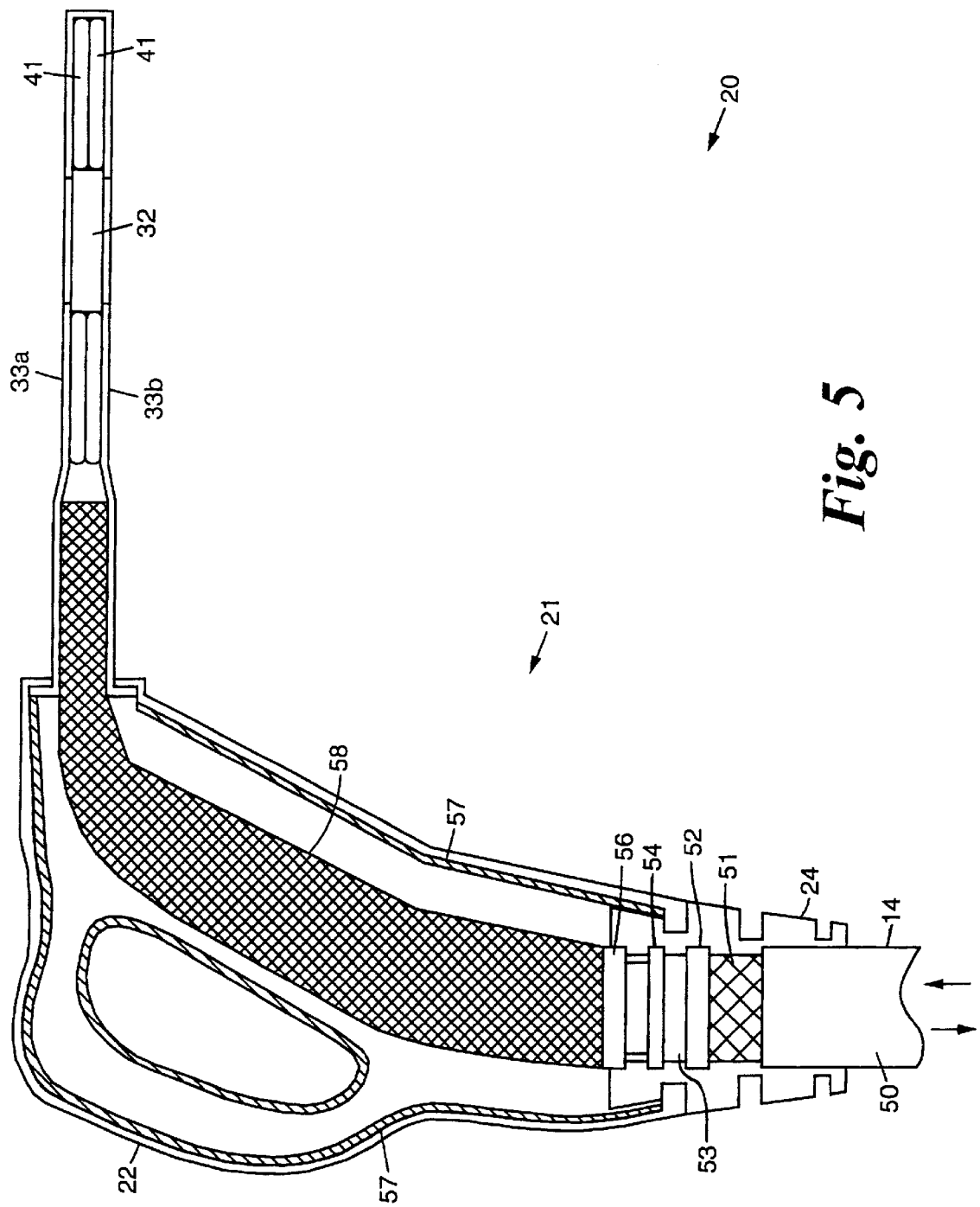
FIG. 5 is a second cutaway side view of the inductive coupler shown in FIG. 2 illustrating continuous EMI containment.

FIG. 2 is a perspective view of the inductive charging coupler 20, while FIGS. 3–5 show cutaway top and side views of the coupler 20 detailing its interior. The coupler 20 has a nonconductive plastic housing 21 with a nonconductive plastic handle 22 that is formed by two mating half shells 22a, 22b. The mating half shells 22a, 22b captivate a strain relief 24 that surrounds the shotgun-type cable 14. The shotgun-type power cable 14 is used to conduct power from the power source 13 to the coupler 20 and transfer cooling fluid between the cooling fluid pumping and cooling apparatus 17 and the coupler 20.

A portion of the coupler 20 that is inserted into the charge port 15 has the shape of a paddle and has upper and lower nonconductive plastic primary winding covers 33a, 33b that mate together. The covers 33a, 33b enclose a fluid-carrying and current-carrying conductive tubular transformer coil 40 (FIG. 3) that is disposed around a ferrite magnetic center core 32 or puck 32.

A plurality of openings 27 are provided through the upper and lower primary winding covers 33a, 33b that are used to mate with a locking mechanism (not shown) that may be employed in the charge port 15. One locking mechanism that may be employed is described in copending U.S. Pat. No. 5,711,558, issued Jan. 27, 1998, entitled "Charger Locking Mechanism", assigned to the assignee of the present invention. Tactile feel indents 39 are provided along the sides of the coupler 20 which are depressions that engage spring-loaded members (not shown) located in the charge port 15. The tactile feel indents 39 in conjunction with the spring-loaded members provide a user with positive feedback that the coupler 20 is fully inserted into the charge port 15.

A plurality of electromagnetic interference fingers (not shown) are provided that mate with conductive plastic strips 38 that are coupled to the primary winding covers 33a, 33b. The conductive plastic strips 38 in turn mate with a metal portion of the charge port 15 to provide continuous shielding to suppress electromagnetic interference radiated by the system 10. The electromagnetic interference fingers are disposed above and below internal surfaces of the conductive plastic strips 38 and which engage when the upper and lower primary winding covers 33a, 33b are mated together.

The plastic components of the coupler 20 may be bonded, ultrasonically welded, or hot plate welded together, and screws may be used to provide additional strength. A typical coupler 20 may have a thickness on the order of 0.600 inch and is received in an appropriately sized opening in the charge port 15.

Referring to FIG. 3, it illustrates a cutaway top view of the inductive coupler 20 shown in FIG. 2. This view of the coupler 20 shows the transformer coil 40 disposed around the ferrite puck 32. The transformer coil 40 has two tubular extensions 41 that extend away from the coiled portion thereof toward the handle 22. FIG. 3 shows a coaxial communication cable 64 that extends out of the cable 14 and which connects to a communication module. The plurality of openings 27 through the lower primary winding cover 33b is shown in FIG. 3.

Referring to FIG. 4, it illustrates a first cutaway side view of the inductive coupler 20. FIG. 5 shows a second cutaway side view of the inductive coupler 20 and illustrates continuous EMI containment provided by the present invention.

FIG. 4 shows that the shotgun-type cable 14 is retained in the coupler 20 by the mating half shells 22a, 22b. The mating half shells 22a, 22b captivate the strain relief 24 disposed around the cable 14. The cable 14 has an outer jacket 50. Inside the outer jacket 50 is a dual (two layer) electromagnetic interference (EMI) shield 51. The EMI shield 51 is retained by a metal collar 53 and clamp 52. The strain relief 24 is held in place by a portion 54 of the metal collar 53. The interior wall of the coupler 20 may have additional conductive material 57 disposed thereon that improves the EMI containment.

The power conductors 62 and fluid carrying conductors 63 of the shotgun-type cable 14 extend into the interior of the coupler 20 and are each surrounded by an insulating jacket 61. The power conductors 62 and fluid carrying conductors 63 mate with and are conductively secured and sealed to respective extensions 41 of the transformer coil 40.

As is shown in FIG. 5, a second clamp 56 in conjunction with the metal collar 53 is used to retain an EMI expansion boot 58. The EMI expansion boot 58 is disposed around the insulating jacket 61, power conductors 62 and fluid-carrying conductors 63 as is shown in FIG. 4, and the extensions 41 of the transformer coil 40 that is retained within the main body of the handle 22. The EMI expansion boot 58 is conductively coupled to the EMI fingers formed in the upper and lower non conductive plastic primary winding covers 33a, 33b with conductive plastic strips 38a and 38b.

Figure 6:
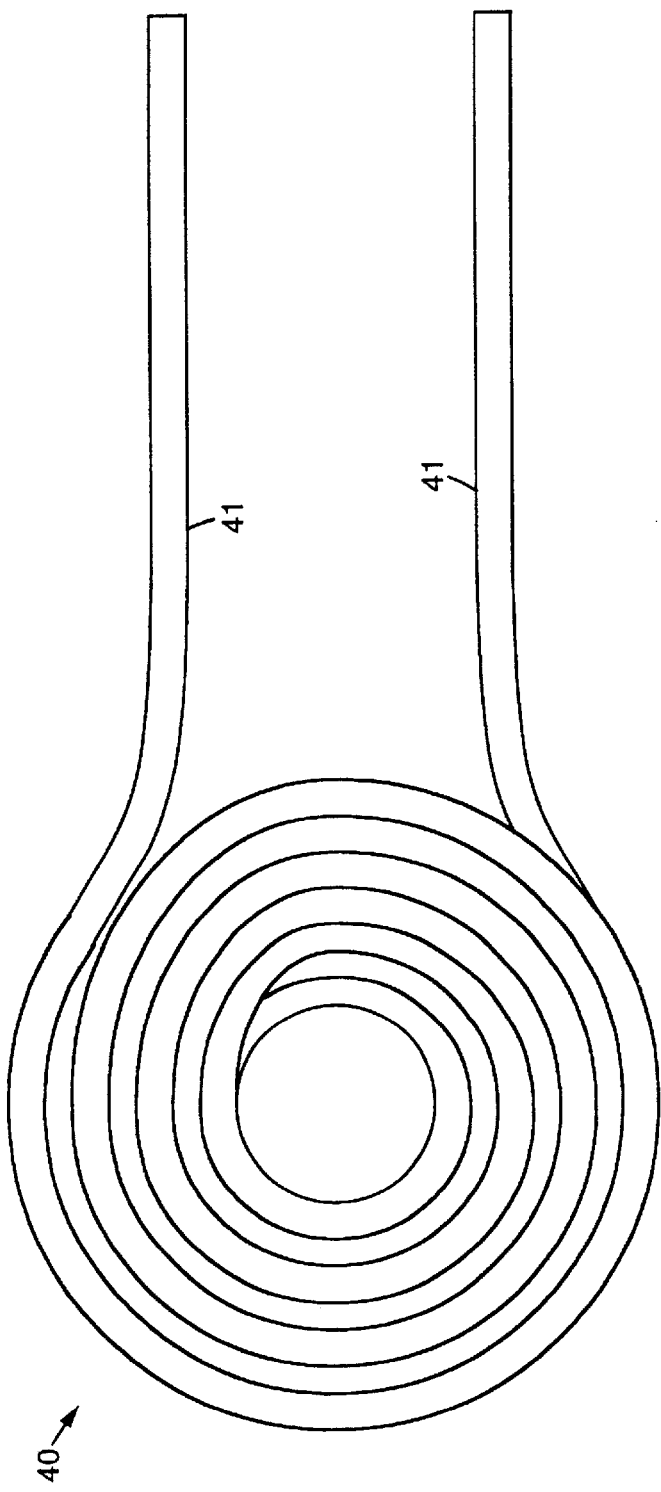
FIG. 6 illustrates a top view of an exemplary eight turn, two level helix, four turn spiral transformer coil in accordance with the principles of the present invention.
Figure 7:
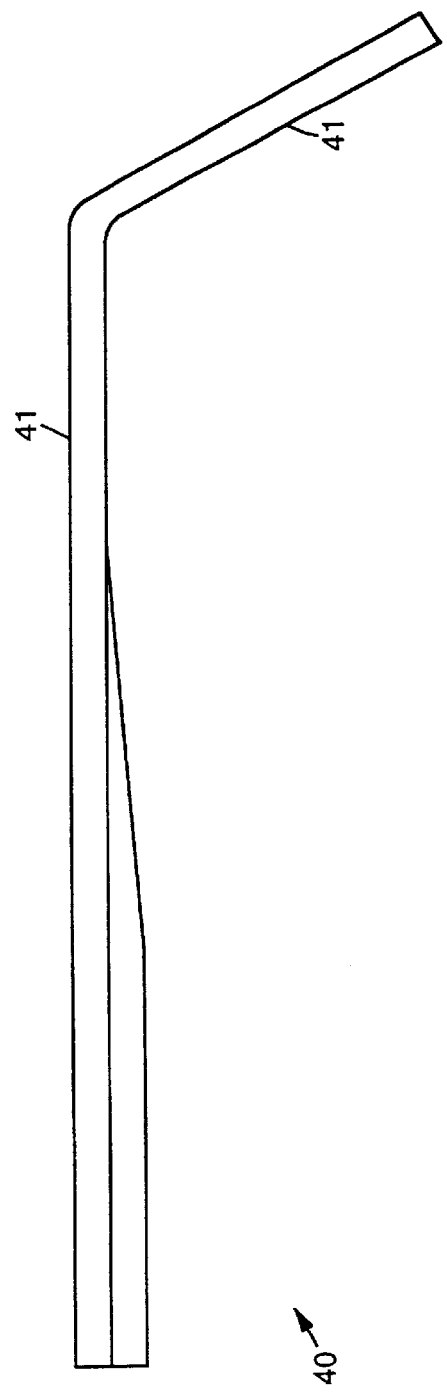
FIG. 7 illustrates a side view of the transformer coil coupler shown in FIG. 6.
Figure 8:
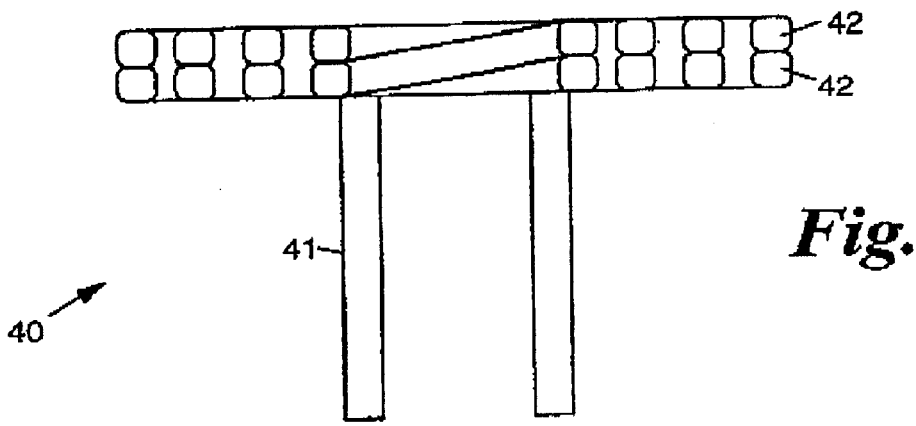
FIG. 8 illustrates an end view of the transformer coil coupler shown in FIG. 6.

Details of the tubular fluid and power carrying conductors 63, 62 are discussed with reference to FIGS. 6–8. FIGS. 6–8 illustrate top, side and end views of an exemplary eight turn, two level helix, four turn spiral transformer coil 40 in accordance with the principles of the present invention. The transformer coil 40 may have different numbers of turns and levels, and the disclosed embodiment is only representative of one particular transformer coil 40 that may be used in the inductive charging system 10 and inductive charging coupler 20. The cutaway end view of the transformer coil 40 shown in FIG. 8 shows that the transformer coil 42 is a hollow tube 42.

Figure 9:
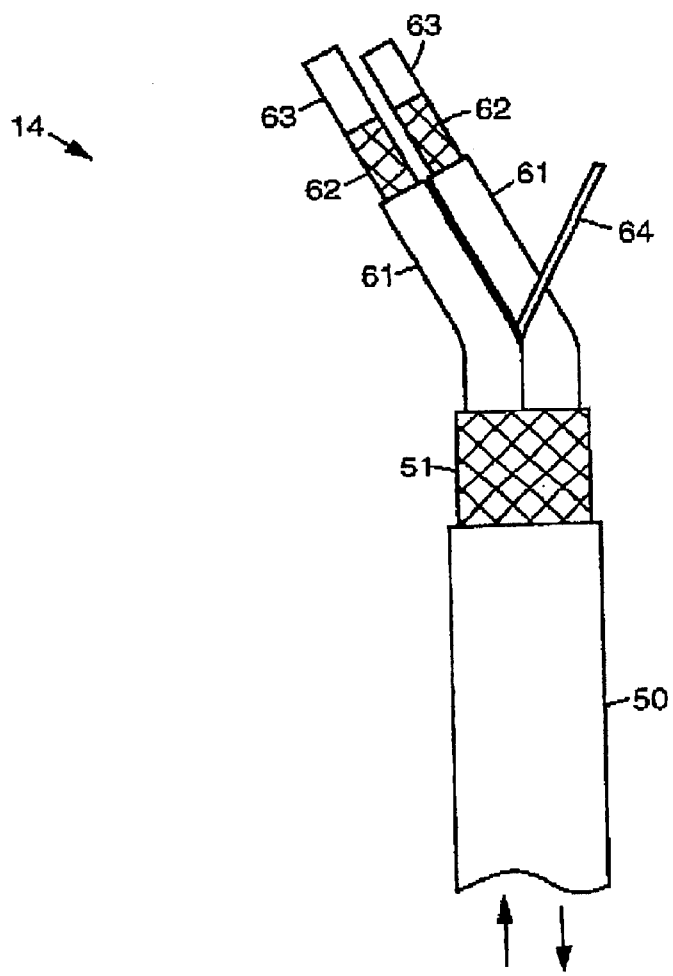
FIG. 9 illustrates a side view of a portion of a liquid-cooled transmission cable used in the inductive coupler shown in FIG. 2.
Figure 10:
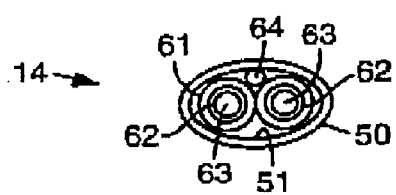
FIG. 10 is a cross-sectional end view of the liquid-cooled transmission cable shown in FIG. 9.

Referring to FIGS. 9 and 10, details of the shotgun-type cable 14 are shown. FIG. 9 illustrates a side view of a portion of the liquid-cooled transmission cable used in the inductive coupler 20. FIG. 10 is a cross-sectional end view of the liquid-cooled transmission cable 14. The power conductors 62 of the shotgun-type cable 14 are disposed around the fluid-carrying conductors 63 and are thus exposed to the cooling fluid 26 (antifreeze 26) which cools the power carrying conductors 62.

The cable 14 contains hollow tubular fluid and power carrying conductors 63, 62 and the coaxial RF cable 64 used for communication. The hollow tubular fluid and power carrying conductors 63, 62 are surrounded by the insulator 61. The hollow tubular fluid carrying conductors 63 provide flow paths for the cooling fluid 26 that is pumped therethrough. The hollow tubular fluid and power carrying conductors 63, 62, the insulator 61, and the coaxial communication cable 64 are shielded by the dual (two layer) EMI shield 51, which is surrounded by the outer jacket 50.

The exemplary embodiment of the eight turn, two level helix, four turn spiral transformer coil 40 shown in FIGS. 6–8 is an insulated tube that comprises a high current carrying capacity conductor, such as copper, that optimizes AC and high frequency losses. Any number of turns may be used in the design of the transformer coil 40 depending upon the application.

Level 2 (6.66 kW) inductive charging systems 10 may readily utilize the transformer coil 40 without requiring liquid cooling. The same transformer coil 40 may be used with liquid cooling for Level 3 charging greater than 7.68 kW. The use of the transformer coil 40 reduces the size, volume and operating temperature of the inductive charging system 10 while increasing the power density and reliability of the inductive charging system 10.

The liquid cooled high current capacity transformer coil 40 is connected to the shotgun-type liquid cooled cable 14 in a manner that integrates and optimizes electrical, thermal and mechanical parameters for the inductive charging system 10. The present inductive charging system 10 employing the improved transformer coil 40 and shotgun-type liquid cooled cable 14 enhances power transfer capability, decreases charging time, reduces assemblies and processes to maintain a compact size and shape. As a result, the present invention provides for an inductive charging system 10 having a simplified design while maintaining and surpassing previous levels of performance.

In addition, the inductive charging system 10 incorporates EMI control in its design. The shotgun-type liquid cooled cable 14 is dual EMI shielded throughout and terminated at the neck of the coupler 20 using the expandable EMI boot 58 that contours and makes contact with conductive plastic internal to the coupler 20. The external conductive plastic strips 38a and 38b of the coupler 20 contacts conductive (copper) EMI fingers in the charge port 15, forming a continuous shield from the power source 13 to the electric vehicle 12.

The inductive charging system 10 may be used to charge electric vehicle battery packs (batteries 11) in a fast and efficient manner while maintaining user interface component touch temperatures well within acceptable limits. In addition, the design of the inductive charging system 10 meets existing inductive charging coupler packaging standards.

At high charge rates, the heat dissipation in the coupler 20 increases in relation to the square of the current that is transferred. As power increases, the amount of heat produced in the cable 14 and coupler 20 becomes significant. The coupler 20 alone dissipates in excess of 180 watts over a 20 square inch area (the surface area is approximately equivalent to the palm size of an adult human hand). Such heat flux, if unmanaged, leads to unacceptable touch temperature profiles. An appropriate thermal management system is essential to add practicality, reliability, and efficiency throughout the entire inductive charging system 20. Therefore, the present invention provides for a liquid-cooled inductive charging system 20 that not only enhances cooling efficiency, but maintains user interface components (cable 14 and coupler 20) touch temperature well within acceptable limits.

The liquid-cooled transformer coil 40 and shotgun-type liquid-cooled cable 14 are preferentially employed in an off-board inductive charger system 20. These components are preferably used when a fast rate of charge of the battery pack (batteries 11) that powers electric vehicles 12 is desired. The liquid-cooled transformer coil 40 and shotgun-type liquid cooled cable 14 may be easily incorporated to an onboard charging system (charge port 15) using a compact closed loop system with an isolated winding/fluid scheme.

In operation, the inductive charging system 10 takes low frequency AC provided by the power source 13 and converts it to high frequency AC. The high frequency AC is transferred through the ferrite core (formed by the mated coupler 20 and charge port 15) and then converted from AC to DC using diode rectifiers. Such conversion makes charging of battery packs (batteries 11) in electric vehicles 12 feasible because the DC voltages are compatible. Theoretically, this is a very straightforward system, yet to have any practicality, the system must be compact, reliable, versatile, and friendly to use.

The present inductive charging system 10, using the fast rate fluid cooled inductive coupler 20, unlike other conventional charging systems, is compact, reliable, versatile, and efficiently maintains a touch temperature well within acceptable limits regardless of the amount of energy that is transferred. The user interface (cable 14, coupler 20) integrates thermal, electrical and mechanical components to enhance performance. Performance is associated with temperature, and temperature plays a key role in the survivability of components. Therefore, emphasis is given to a fluid-cooled thermal management system.

The power dissipated by the components, cable 14 and coupler 20 dictates the size and ultimately the rate of charge the system 10 can handle. The dissipation power is minimized throughout the coupler 20 and transformer coil 40 by optimizing AC, high frequency parameters. For instance, a decrease of conductor resistance, $R_{AC}$, yields lower losses. Nonetheless, at a high rate of charge, dissipation power is substantial. The dissipated power is presented in the form of heat. Heat is absorbed by the circulating cooling fluid 26 which is within and in close contact with the current-carrying conductors 62 of the cable 14. Heat is removed and transported by the cooling fluid 26 to a heat exchanger in the cooling fluid pumping and cooling apparatus 17 for maximum heat transfer.

Currently available conventional fast charging systems utilize heat exchangers, laminates and flood boxes as building blocks for the coupler 20. The present invention consolidates these components and uses the liquid cooled high frequency, high current carrying capacity coil 40 to achieve this.

The thermal management system used in the inductive charging system 10 is a closed loop system and is provided by the cooling fluid pumping and cooling apparatus 17, which includes, but is not limited to, an expansion tank, a pump/motor, interconnecting lines, transformer coil 40, fluid-carrying conductors 63 and 62 of the cable 14, and a liquid-to-air heat exchanger including one or more fans. The heat sinks are appropriately sized, and one or more of them may have a multiple duty in the system 10. Specific examples of multiple duty components are the cable 14 and the coupler 20 which integrate electrical, mechanical and thermal functions to deliver a high rate of charge, an acceptable touch temperature, and a compact cable cross-sectional configuration.

The total dissipated power determines the rate of charge and physical size of the inductive charging system 10, and includes internal heat dissipation from electronic components, cable 14, coupler 20 and heat load from the surroundings. Therefore, physical size and performance are proportionally related one to the other, giving versatility to the inductive charging system 10 that may be optimized for a wide range of charging capacities within the same system 10.

The ferrite core is optimized at a small size. A smaller size is desired because this increases magnetic flux but decreases the saturation time. Such a configuration provides for a fast rate of charge at a higher frequency. As a result, higher frequency (greater than 10 kHz) introduces excessive eddy current losses. The heat generated by the eddy current losses are efficiently neutralized by incorporating fluid flow passages integrated at the source of heat. This approach was successfully used and proved in a 50 kW demonstration unit developed by the assignee of the present invention. The transformer coil 40 served three functions, including a high current carry capacity conductor, as magnetic turns for the primary coil, and as a structural return line heat exchanger transferring heat back to the cooling fluid pumping and cooling apparatus 17.

The rapid high rate of charging of an electric vehicle 12 using the transformer coil 40 of the present invention was demonstrated in a 50 kW fluid-cooled inductive system 10. It was found that the electronic components, cable 14, and coupler 20 maintained an acceptable temperature profile. Temperature profiles are below 66° C. at room ambient conditions, a temperature that is far away from maximum failing temperature of any electronic component used in the system 10. Adjustments were made to the 50 kW charge rate in an attempt to substantiate size, geometry, and performance. It was found that, at higher charge rates, capacity as well as performance could be increased by increasing flow rates of the cooling fluid 26.

The present inductive charging system 10, unlike certain other chargers, is compact, reliable, versatile, and efficiently maintains a low touch temperature. Its multiple duty components which integrate electrical, mechanical and thermal functions, and the fact that the system 10 may be optimized, makes the system 10 practical.

Thus, an inductive charging system and improved fluid-cooled transformer coil and transmission cable for use therein have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. Apparatus for use with an inductive charging system having a power source, cooling fluid pumping and cooling apparatus, a charging coupler, and a charge port disposed in an electric vehicle that is coupled to batteries thereof, and wherein the coupler is insertable into the charge port to inductively couple power from the power source to charge the batteries of the electric vehicle, said apparatus comprising:

a fluid-cooled inductive charging coupler comprising a housing, a puck disposed in the housing, and an insulated, liquid-cooled, current carrying conductive tubular transformer coil disposed around the puck that forms a primary winding of the inductive charging apparatus; and a liquid-cooled, liquid-carrying tubular transmission cable coupled to the power source, to the cooling fluid pumping and cooling apparatus, and to the tubular transformer coil, for coupling current from the power source to the transformer coil, and for coupling cooling fluid through the transformer coil.

2. The apparatus recited in claim 1 wherein the cooling fluid is pumped through the transmission cable and the transformer coil to cool the transformer coil and the puck, whereby high levels of current are capable of being transferred between the power source and the propulsion batteries of the electric vehicle.

3. The apparatus recited in claim 1 wherein the coupler comprises a nonconductive plastic housing having a nonconductive plastic handle and a strain relief that surrounds the shotgun-type cable, and upper and lower mating plastic primary winding covers.

4. The apparatus recited in claim 1 wherein the cable comprises:

fluid-carrying conductors surrounded by an insulating jacket;

power-carrying conductors surrounding the fluid-carrying conductors;

an electromagnetic interference shield surrounding the fluid- and power-carrying conductors; and an outer jacket surrounding the electromagnetic interference shield.

5. The apparatus recited in claim 1 wherein the puck comprises ferrite.

6. The apparatus recited in claim 1 further comprises an electromagnetic interference expansion boot surrounding the insulating jacket, the power conductors, the fluid-carrying conductors, and a portion of the transformer coil.

7. The apparatus recited in claim 1 wherein the transformer coil comprises an eight turn, two level helix, four turn spiral transformer coil.

8. An inductive charging system comprising:

a power source;

a cooling fluid pumping and cooling apparatus;

a charge port disposed in an electric vehicle that is coupled to batteries thereof, and that comprises a secondary winding of the charging system; and a high power fluid-cooled inductive charging coupler comprising:

a housing;

a puck disposed in the housing;

an insulated, liquid-cooled, current carrying conductive tubular transformer coil disposed around the puck that forms a primary winding of the charging system; and a liquid-cooled, liquid-carrying tubular transmission cable coupled to the power source, to the cooling fluid pumping and cooling apparatus, and to the tubular transformer coil, for coupling current from the power source to the transformer coil, and for coupling cooling fluid from the cooling fluid pumping and cooling apparatus to the transformer coil;

and wherein the coupler is insertable into the charge port to couple power from the power source to charge the batteries of the electric vehicle.

9. The system recited in claim 8 wherein the cooling fluid is pumped through the transmission cable and the transformer coil to cool the transformer coil and the puck, whereby high levels of current are capable of being transferred between the power source and the propulsion batteries of the electric vehicle.

10. The system recited in claim 8 wherein the coupler comprises a nonconductive plastic housing have a nonconductive plastic handle and a strain relief that surrounds the shotgun-type cable, and upper and lower mating plastic primary winding covers with conductive plastic strips to form an EMI shield when inserted in the charge port with conductive EMI fingers.

11. The system recited in claim 8 wherein the cable comprises:

fluid-carrying conductors surrounded by an insulating jacket;

power-carrying conductors surrounding the fluid-carrying conductors;

an electromagnetic interference shield surrounding the fluid- and power-carrying conductors; and an outer jacket surrounding the electromagnetic interference shield.

12. The system recited in claim 8 wherein the puck comprises ferrite.

13. The system recited in claim 8 further comprising an electromagnetic interference expansion boot surrounding the insulating jacket, the power conductors, the fluid-carrying conductors, and a portion of the transformer coil.

14. The system recited in claim 8 wherein the transformer coil comprises an eight turn, two level helix, four turn spiral transformer coil.

15. The system recited in claim 8 wherein the cable and the coupler comprises electromagnetic shielding to provide continuous shielding to suppress electromagnetic interference radiated by the system between the power source and the charge port.

16. Apparatus for use with an inductive charging system having a power source, cooling fluid pumping and cooling apparatus, a charging coupler, and a charge port disposed in an electric vehicle that is coupled to batteries thereof, and wherein the coupler is insertable into the charge port to inductively couple power from the power source to charge the batteries of the electric vehicle, said apparatus comprising:

a fluid-cooled inductive charging coupler comprising a housing, a puck disposed in the housing, and an insulated, liquid-cooled, current-carrying conductive tubular transformer coil disposed around the puck that forms a primary winding of the inductive charging apparatus, wherein said current-carrying conductive tubular transformer coil comprises a two level helix, four turn spiral winding; and a liquid-cooled, liquid-carrying tubular transmission cable coupled to the power source, to the cooling fluid pumping and cooling apparatus, and to the tubular transformer coil, for coupling current from the power source to the transformer coil, and for coupling cooling fluid through the transformer coil.

* * * * *